United States Patent
Gaucher et al.

(10) Patent No.: US 10,059,309 B2
(45) Date of Patent: Aug. 28, 2018

(54) END FITTING WITH PLAY COMPENSATION FOR WIPER

(71) Applicant: Valeo Systémes d'Essuyage, Le Mesnil Saint Denis (FR)

(72) Inventors: Vincent Gaucher, Ennezat (FR); Stéphane Houssat, Blanzat (FR); Olivier Jomard, Aubiere (FR); Eric Poton, Pont du Chateau (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 198 days.

(21) Appl. No.: 15/098,562

(22) Filed: Apr. 14, 2016

(65) Prior Publication Data

US 2016/0304061 A1    Oct. 20, 2016

(30) Foreign Application Priority Data

Apr. 14, 2015  (FR) ..................... 15 53223

(51) Int. Cl.
    *B60S 1/38*    (2006.01)
(52) U.S. Cl.
    CPC ........... *B60S 1/3891* (2013.01); *B60S 1/3889* (2013.01)

(58) Field of Classification Search
    CPC ........................................ B60S 1/3886–1/3896
    See application file for complete search history.

(56) References Cited

U.S. PATENT DOCUMENTS

2010/0139026 A1* 6/2010 Ku .......................... B60S 1/381
                                                      15/250.201

FOREIGN PATENT DOCUMENTS

WO        2013000650 A1    1/2013

* cited by examiner

*Primary Examiner* — Andrew A Horton
(74) *Attorney, Agent, or Firm* — Osha Liang LLP

(57) ABSTRACT

The invention relates to an end fitting 1 for a vehicle window wiper, comprising at least one longitudinal support and a blade intended to be pressed against the window, the end fitting 1 comprising a housing 5 that is able to receive an end part of the longitudinal support, the end fitting comprising at least one means 7 for locking the end part of the longitudinal support in the position fitted in the housing 5, said end fitting 1 comprising at least one means 43 that forms a stop against the end part of the longitudinal support, characterized in that the means 43 is flexible so as to cause the locking means 7 to bear against the longitudinal support.

12 Claims, 3 Drawing Sheets

END FITTING WITH PLAY COMPENSATION FOR WIPER

Figure 1:
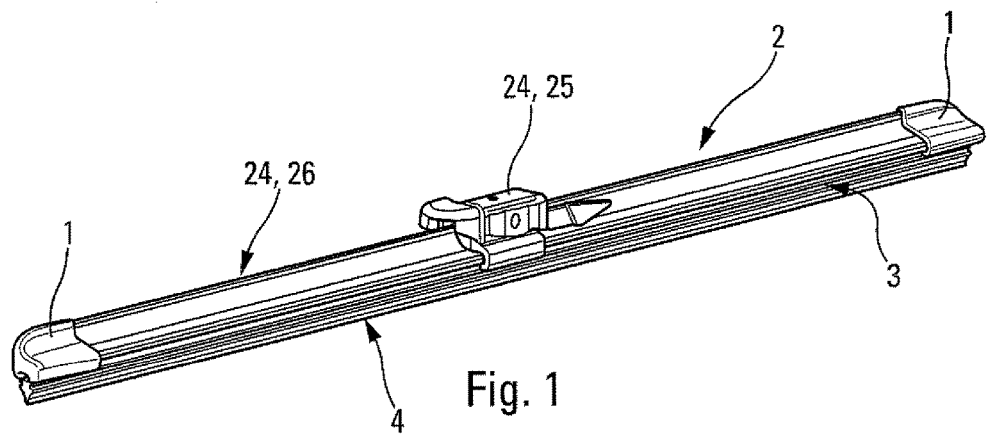

The field of the present invention is that of wipers used on motor vehicles. The invention relates particularly to an end fitting mounted at the end of a wiper. The invention also relates to a wiper and to a wiping system incorporating such a wiper.

Motor vehicles are commonly equipped with windscreen wiper systems for wiping and washing the windscreen and avoiding disruption to the driver's view of his surroundings. These windscreen wipers are conventionally driven by an arm that carries out an angular to-and-fro movement and have elongate wipers which themselves carry squeegee blades made of an elastic material. These blades rub against the windscreen and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In this second solution, the wiper is attached to the turning arm of the windscreen wiper by an assembly consisting of a mechanical connector and an adaptor. The mechanical connector is a piece which is crimped directly onto the flat wiper, while the adaptor is an intermediate piece which allows the connector to be fastened to the arm of the windscreen wiper.

The document WO2013/000650 shows a vehicle window wiper comprising at least one longitudinal support and a blade intended to be pressed against the window, said wiper being equipped with an end fitting comprising a housing that is able to receive an end part of the longitudinal support, at least one means for locking the end part of the longitudinal support in the position fitted in the housing, and at least one means that forms a stop against the end part of the longitudinal support. The end fitting disclosed in that document has several drawbacks.

Firstly, it has been found that the locking of said end fitting involves very fine control of the string of dimensions between the position of the locking means and the position of the cavity formed in the longitudinal support.

Secondly, said end fitting should be designed so as to allow the end fitting to be locked to the support while avoiding the presence of play between these two parts, such play being detrimental to the appearance of quality of the wiper holding such a support and such an end fitting. Such a design is complicated to handle.

The aim of the present invention is therefore to remedy the above-described drawbacks by designing an end fitting or a wiper which comprises a means that ensures that the end fitting is locked properly to the support while preventing any play that is detrimental to the appearance of such a wiper.

Therefore, the subject of the invention is an end fitting for a vehicle window wiper, comprising at least one longitudinal support and a blade intended to be pressed against the window, the end fitting comprising a housing that is able to receive an end part of the longitudinal support, the end fitting comprising at least one means for locking the end part of the longitudinal support in the position fitted in the housing, said end fitting comprising at least one means that forms a stop against the end part of the longitudinal support, characterized in that the means is flexible so as to cause the locking means to bear against the longitudinal support. Such an end fitting makes it possible to compensate for the longitudinal play and it is thus possible to design parts with less narrow tolerances, which are thus less expensive.

According to one aspect of the invention, the flexibility of the means that forms a stop results from elasticity of the material of which the means is made. It is thus the elastic deformation of the means which ensures that the locking means bears against the longitudinal support.

According to one exemplary embodiment, the means that forms a stop is a tongue that extends from an outside wall delimiting the end fitting. A tongue is a part which starts from a base and extends freely in terms of length.

This tongue extends through an internal volume delimited by the outside wall, and in particular in a direction concurrent with a plane in which most of the housing extends.

Advantageously, the tongue has a parallelepipedal section.

According to one exemplary embodiment, the tongue extends in a plane which forms an angle of between 10° and 85° with a longitudinal mid-plane of the end fitting.

It will be noted that the means that forms a stop may comprise two tongues that are formed on either side of a longitudinal mid-plane of the end fitting.

Advantageously again, the locking means comprises an elastic arm that is rotatable about an axis which extends approximately parallel to a plane in which most of the housing extends and perpendicularly to a longitudinal direction of the end fitting.

The invention also relates to a wiper comprising at least one longitudinal support and a blade intended to be pressed against the window, the longitudinal support comprising a notch formed in an end part of the longitudinal support, characterized in that it comprises an end fitting according to any one of the features set out above.

Advantageously, the locking means comprises a longitudinal blocking portion that bears against at least one edge of the notch, said bearing being brought about by the flexibility of the means that forms a stop.

The end part of the longitudinal support can comprise at least one bevel that bears against a face of the means that forms a stop.

Finally, the invention covers a vehicle window wiping system comprising an arm and a wiper as described above.

A first advantage of the invention lies in the absence of longitudinal play, which a user can perceive as being a defect or the sign of a low-quality product. Such play compensation is effected extremely simply and inexpensively by virtue of the end fitting according to the invention.

Figure 2:
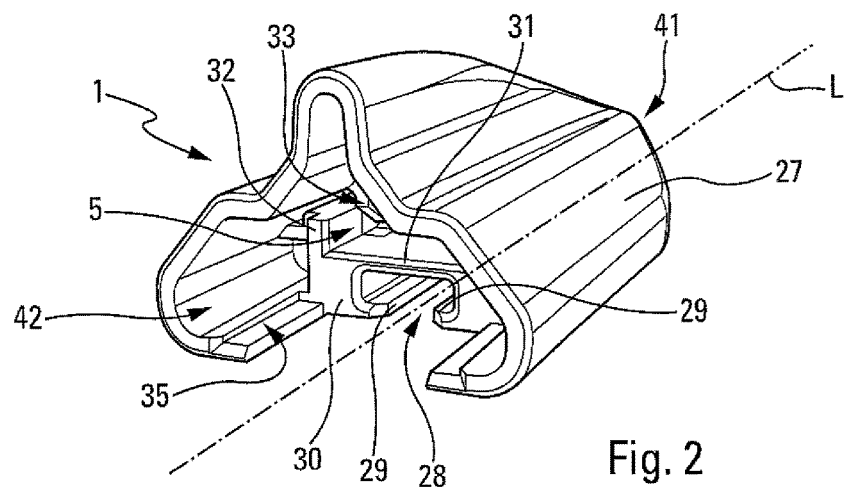
Figure 3:
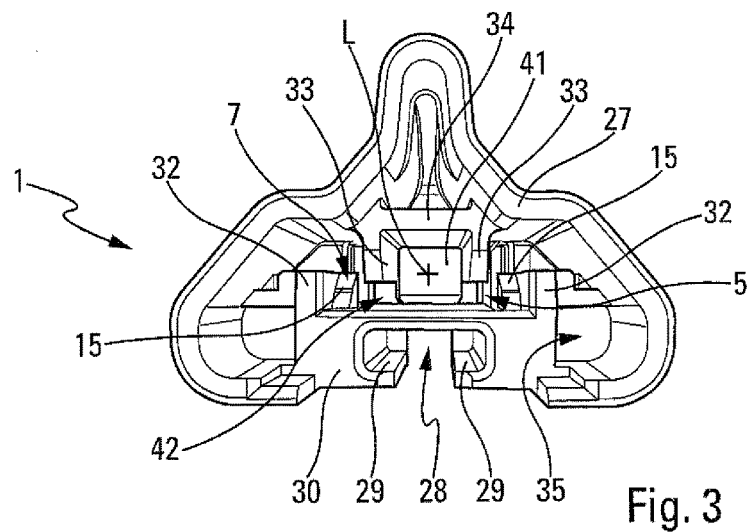
Figure 4:
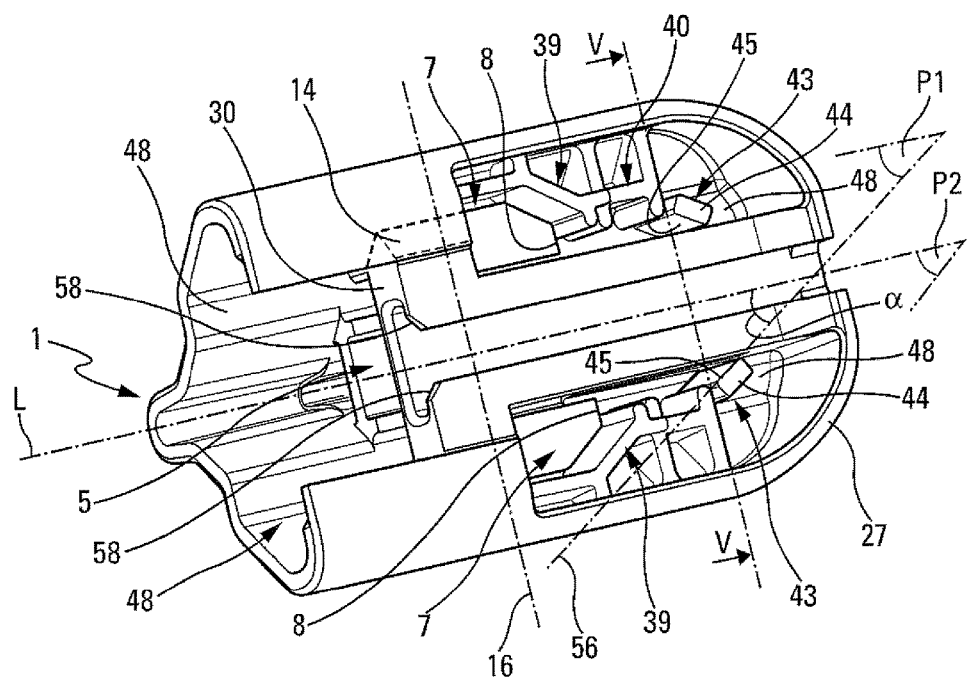
Figure 5:
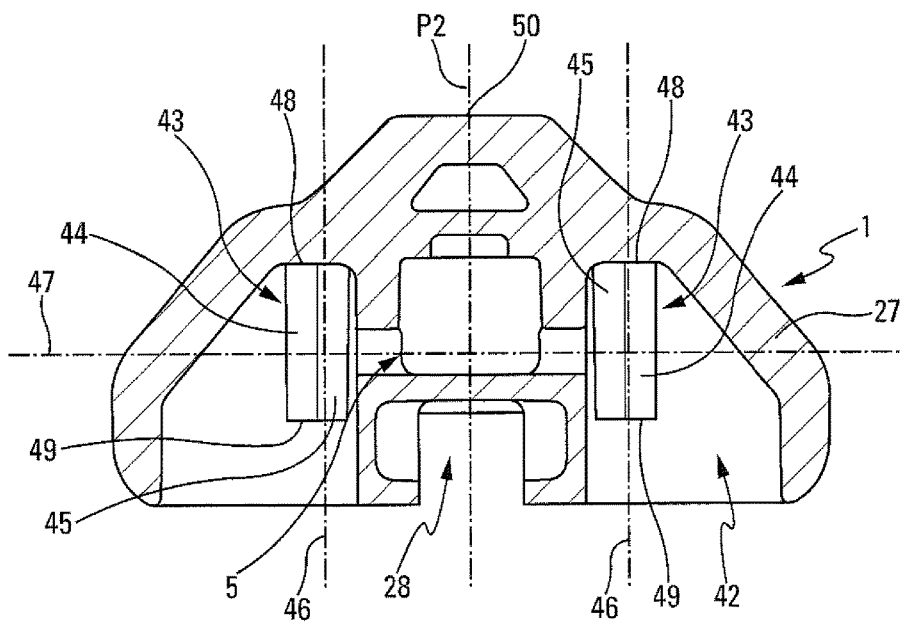
Figure 6:
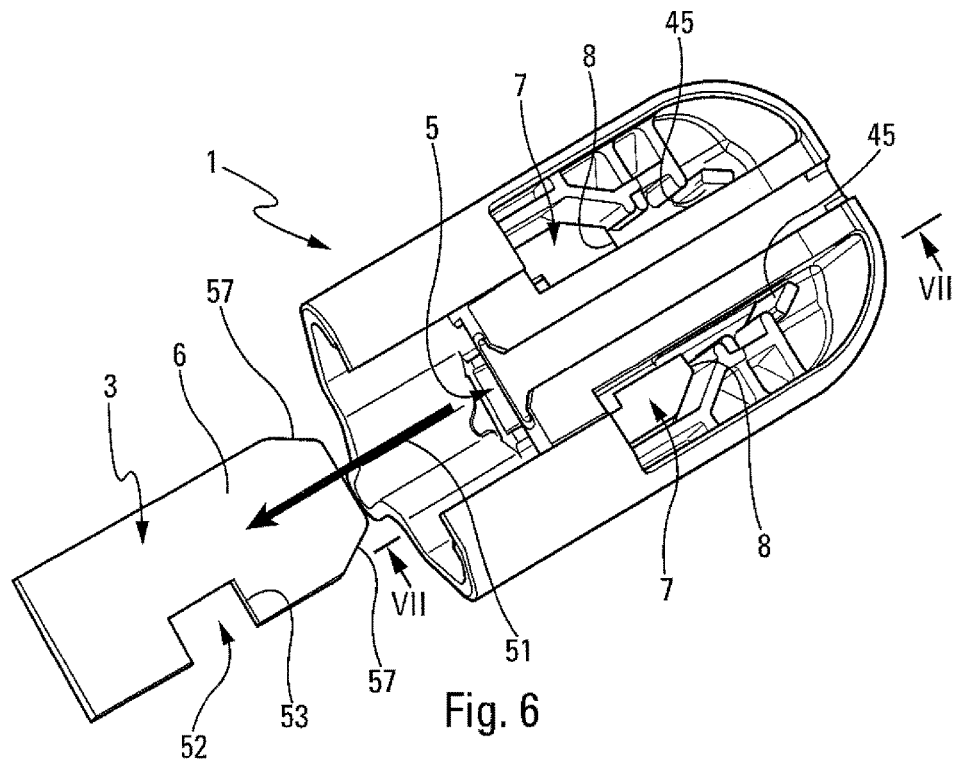
Figure 7:
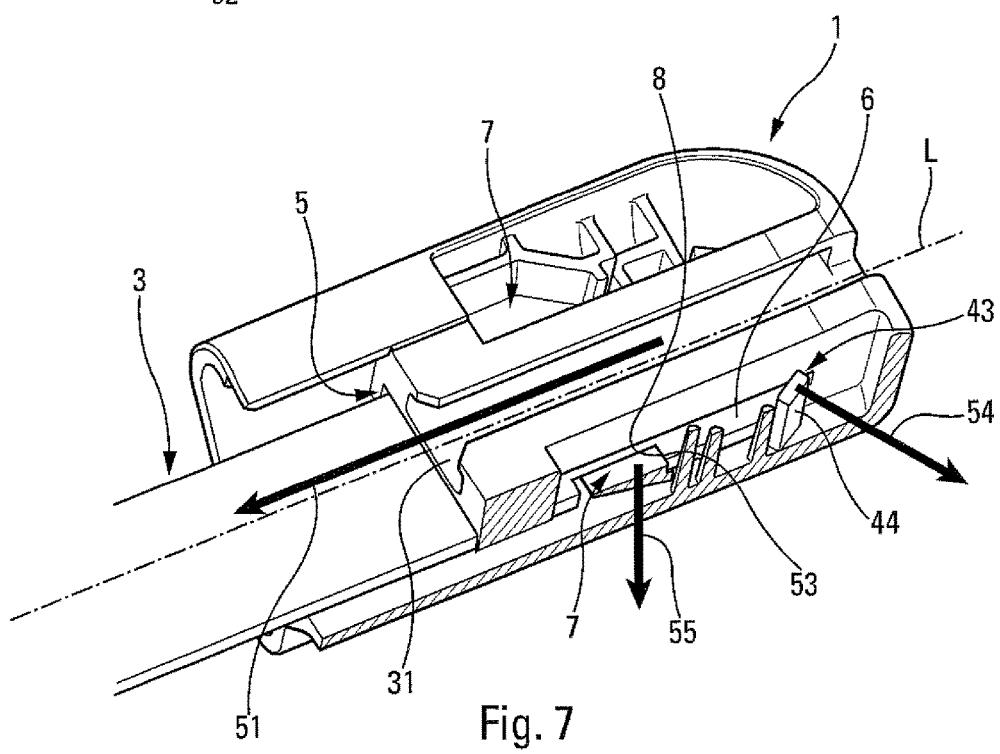

Further features, details and advantages of the invention will become more clearly apparent from reading the description given below by way of indication with reference to the drawings, in which:

FIG. 1 is an overall perspective view of a wiper according to the invention, FIG. 2 is a perspective view of an end fitting according to the invention, FIG. 3 is a perspective front view of the end fitting according to FIG. 2, FIG. 4 is a perspective bottom view of the end fitting according to FIG. 2, FIG. 5 is a cross-sectional view V-V illustrated in FIG. 4 of the end fitting according to the invention, FIG. 6 is a schematic view illustrating the fitting of the end fitting on the longitudinal support, FIG. 7 is a schematic view showing the flexibility of the means that forms a stop, and also the effect of this flexibility.

It should first of all be noted that the figures disclose the invention in a detailed manner so as to implement the invention, and said figures may of course serve to define the invention more clearly, where necessary.

In the rest of the description, the denominations longitudinal or lateral, top, bottom, front, rear refer to the orientation of the wiper or of the end fitting according to the invention. The longitudinal direction corresponds to the main axis of the wiper along which it extends, while the lateral orientations correspond to concurrent straight lines, that is to say straight lines which intersect the longitudinal direction, notably perpendicularly to the longitudinal axis of the wiper in the plane in which it rotates. For longitudinal directions, the denominations outside and inside are to be assessed in relation to the point at which the wiper is fixed to an arm for driving this wiper in rotation, the denomination inside corresponding to the part in which the arm and a half-wiper extend. Finally, directions referenced as being upper or lower correspond to orientations perpendicular to the plane of rotation of the wiper, the denomination lower containing the plane of the windscreen.

Referring first of all to FIG. 1, a wiper 2 according to the invention can be seen. Such a wiper 2 is used to wipe a window of a vehicle and to move the water present on this window out of a driver's field of view. The wiper 2 is made up of at least one longitudinal support 3, a component 24, a rubbing blade 4 and at least one, or even two, end fittings 1 that are installed on each end part of the longitudinal support 3. The longitudinal support 3 is advantageously flexible.

The longitudinal support 3 may take the form of a single flat and elastic metal strip. According to one alternative, the longitudinal support 3 may be formed by two metal and elastic strips that are each housed in a slot formed on either side of the blade 4. In the two cases above, in the rest state, such a metal strip is curved in a plane perpendicular to a longitudinal direction of the strip. The function of such a metal strip, whether there is one or two thereof, is to distribute along the blade 4 the bearing forces that are generated by a connection means 25 attached to the longitudinal support at the centre, longitudinally, of the wiper 2.

The component 24 denotes several types of constituent part of the wiper 2. It may be the connection means 25 intended to connect the wiper to an arm for driving this wiper in rotation. It may also be one or more air deflectors 26 which are attached to the longitudinal support 3 and the function of which is to convert the air flow passing over the wiper into a bearing force which presses the blade 4 against the window.

The wiper 2 also comprises two end fittings 1 of identical form, as described below with reference to FIGS. 2 to 7.

FIGS. 2 and 3 show a perspective view of the end fitting 1. Such an end fitting 1 has a function of mechanically holding the constituent components of the wiper 2. This end fitting 1 also has an aesthetic function since it makes it possible to cleanly cover and thus conceal the end of the blade 4, the end of the longitudinal support 3 and the end of the component 24, notably the air deflector 26.

The end fitting 1 has an outside wall 27 generally complementary to the outside profile of the air deflector 26. Inside an internal volume 42 delimited by the outside wall 27, the end fitting 1 comprises a housing 5 for receiving the end part of the longitudinal support, not shown in these figures. The end fitting 1 also comprises a slot 28, the function of which is to mechanically retain a heel of the blade 4. Such a slot 28 is formed in a body 30 of the end fitting 1, in particular in a lower part of this body. This slot 28 is open towards the outside, this opening being delimited by two hooks 29 which extend longitudinally along the end fitting 1.

The housing 5 is formed in the body 30 of the end fitting, between the slot 28 and the outside wall 27, as seen in a direction perpendicular to a plane of extension of the slot 28.

The housing 5 is delimited by a bottom wall 31 and at least two side edges 32, and also by at least one flank 33, and notably two flanks 33. These flanks 33 are each formed by a rib made in one piece with the outside wall 27. These flanks 33 are connected together by a bridge of material 34. The flanks 33 extend in planes perpendicular to a plane in which the bottom wall 31 extends, and thus parallel to planes of extension of the side edges 32.

The end fitting 1 comprises a rear part 41 which closes the internal volume 42 of the end fitting 1 by means of the outside wall 27. At the end away from this rear part with respect to the housing 5 in the longitudinal direction L, the end fitting 1 is open and the outside wall 27 delimits a reception zone 35. The latter receives notably at least one of the components of the wiper, for example one end of the air deflector which is housed in the reception zone 35.

The end fitting 1 also comprises a locking means 7, which can be seen in FIG. 3. This is a means of which the function is to retain the end fitting 1 on the wiper in the longitudinal direction, so as to prevent it from coming away from the wiper, in the longitudinal direction of the latter. This locking means 7 is for example in the form of a tooth that is intended to be housed in a notch, also known as a cavity, formed on or in the longitudinal support 3.

FIGS. 4 to 7 show this locking means 7 in more detail. In FIG. 4, the end fitting 1 is shown in this case from below, the slot 28 and the reception zone 35 thus being open towards a lower face of the end fitting 1.

The locking means 7 comprises an elastic arm 14 which extends from the body 30 of the end fitting 1. This elastic arm 14, also referred to as a flexible tongue, is rotated about an axis 16. The latter is parallel, or approximately parallel, to a plane in which the housing 5 that receives the end part of the longitudinal support extends. This axis 16 is also perpendicular, or approximately perpendicular, to the longitudinal direction L of the end fitting 1. It will be understood here that the elastic arm is moved either towards the lower face of the end fitting 1, or towards the outside wall thereof. Taken in another frame of reference, the elastic arm 14 is moved either towards the blade 4 of the wiper 2, or towards a top of the air deflector 26 (FIG. 1), about a hinge formed by the axis 16.

The locking means 7 comprises a portion 8 that is able to form a longitudinal stop with regard to the longitudinal support. When the end fitting 1 has been threaded onto the end part of the longitudinal support, this portion 8 engages with the notch formed in the longitudinal support so as to prevent the longitudinal movement, in one direction, between the end fitting 1 and the wiper. This portion 8 thus bears against an edge of the longitudinal support which delimits the notch.

The locking means 7 forms an "L"-shaped profile, as seen in a plane approximately parallel to a plane in which most of the housing 5 extends, one leg of the "L" extending parallel to the longitudinal direction L of the end fitting 1 while a second leg of the "L" extends perpendicularly to the longitudinal direction L of the end fitting 1, or, in other words, parallel to the axis 16.

FIG. 4 shows two locking means 7 that are formed symmetrically with respect to a longitudinal mid-plane that passes notably through a top of the end fitting 1.

Moreover, as illustrated in FIG. 4, each hook 29 preferably has an inclined free end 58 so as to make it easier to fit the slot 28 around a heel of the blade, when the end fitting 1 is threaded onto the end part 6 of the flexible support 3.

According to the invention, the end fitting comprises at least one means 43 that forms a stop against the end part of the longitudinal support. This means 43 bears directly against an edge present at the end of the end part of the longitudinal support. This means 43 is flexible so as to cause the locking means to bear against the longitudinal support. In other words, it is the elasticity of the means 43 which ensures that the locking means 7, in particular the portion 8, is properly in contact with the longitudinal support, thereby preventing any relative translational movement between the end fitting 1 and the longitudinal support.

The flexibility of the means 43 results for example from elasticity of the material of which the means is made. For example, the material which confers strength and elasticity is chosen from the following list: PC ABS (Polycarbonate/Acrylonitrile Butadiene Styrene), POM (polyoxymethylene).

The means 43 is in particular moulded together with the wall 27 while the end fitting 1 is being manufactured.

The elasticity of the means may also originate from its elongate shape secured to the wall 27 at only one of the ends of this shape. As an exemplary embodiment, the means 43 is in the form of a tongue 44 which extends from the outside wall 27 delimiting the end fitting 1. More specifically, the tongue 44 starts from a flat portion 48 that is part of the outside wall 27.

The tongue 44 therefore extends from an internal face of the end fitting which delimits the outside wall 27. It will thus be understood that the tongue 44 extends through the internal volume 42 delimited by the outside wall 27 and in a direction concurrent with a plane in which the housing 5 of the end fitting 1 is inscribed. Away from its base from which it extends, the tongue 44 is at a distance from the other constituent walls of the end fitting 1.

In the example illustrated, the tongue 44 has a constant thickness, but in an alternative or additional manner, in a variant that is not shown, the flexibility of the means 43 results from the reduced thickness of at least one portion of the tongue 44, notably a portion adjacent to the wall 27.

According to one embodiment of the invention, the tongue 44 has a parallelepipedal section. This is only one exemplary embodiment, and it will be understood that any section is covered by the invention, as long as this section allows the tongue to bend. On the other hand, the parallelepipedal section has the advantage of defining at least one face 45 having a shape complementary to the edge formed at the end of the end part of the longitudinal support. This parallelepipedal section is seen in a plane intersecting the tongue 44, this plane being parallel to the plane of extension of the housing 5.

Advantageously, the tongue 44 extends in a plane P1, one direction 56 of which forms an angle α of between 10° and 85° with a longitudinal mid-plane P2 of the end fitting 1, in which the longitudinal direction L of extension of the end fitting 1 is inscribed. More specifically, the angle α is measured when the plane P1 passes through the face 45 delimiting the tongue 44. The fact that the tongue is inclined with respect to the longitudinal mid-plane of the end fitting 1 also makes it possible to easily position the end fitting 1 on the end part of the longitudinal support.

FIG. 5 shows the end fitting 1 according to the invention in a cross section V/V illustrated in FIG. 4. The slot 28 is positioned under an end portion of the housing 5, with the bottom wall 31 positioned between these two reception zones. The wall 27 delimits the internal volume 42 inside which the means 43 that forms a stop extends. The latter is for example in the form of a tongue 44 which extends in a direction 46 perpendicular, or approximately perpendicular, to a direction 47 that passes through a centre of the housing 5 that is intended to receive the end part of the longitudinal support.

As indicated above, the tongue 44 extends from a flat portion 48 facing the internal volume 42 and extends beyond the housing 5, notably until its distal part 49 extends in a plane which intersects the slot 28. This ensures that the tongue 44 is long enough to come into contact with the end part of the longitudinal support.

FIG. 5 also clearly highlights the face 45 of the tongue against which the edge of the end part of the longitudinal support bears.

Advantageously, the means 43 that forms a stop may comprise two tongues with a structure similar to the one explained above. These two tongues 44 are then formed on either side of the longitudinal mid-plane P2 of the end fitting, said plane passing through a top 50 of the end fitting 1 and at the centre of the housing 5. The two tongues 44 are notably symmetrical with respect to this plane P2.

FIG. 6 and FIG. 7 illustrate the assembly of the end fitting 1 on the longitudinal support 3. In FIG. 6, the end fitting 1 is in the phase approaching the housing 5 by way of a translational movement illustrated by the arrow referenced 51. The longitudinal support 3 comprises the notch 52, the latter passing right through the end part of the longitudinal support. According to one exemplary embodiment, the notch 52 may be in the form of a recess or cutout made at the edge of the end part 6 of the longitudinal support 3. Alternatively, the notch 52 forms a hole surrounded by the end part 6.

The edge 53 is the part which delimits the notch 52 and against which the portion 8 of the locking means 7 bears in order to prevent the end fitting 1 from moving in translation with respect to the longitudinal support 3.

The end part 6 of the longitudinal support 3 comprises at least one bevel 57, and advantageously two bevels 57, which are designed to bear against the face 45 of the tongue 44. Bearing is thus ensured along a sufficient length, at least equal to a width of the tongue 44. It is therefore ensured that the pushing force on the tongue 44 translates into bending, thereby avoiding the creation of irreversible deformation of the tongue 44.

FIG. 7 shows the end fitting 1 threaded onto the end part 6 of the longitudinal support 3 at the moment at which the edge of the end part bears against the means 43 that forms a stop. This figure also shows the engagement between the locking means 7, a securing device and the longitudinal support 3. The housing 5 receives the end part 6 of the longitudinal support 3 between the bottom wall 31 and the ribs 33 (FIG. 3).

The tongue 44 moves within its elastic range, that is to say in a range ensuring that it returns to its position after it has been subjected to the force brought about by the longitudinal support 3 bearing against the tongue 44. This movement is illustrated by the arrow referenced 54 which extends towards the outside of the end fitting 1 and in a direction concurrent with the longitudinal direction L of the end fitting 1. This movement afforded by the flexibility of the means 43 that forms a stop allows the locking means 7 to be housed in the notch 52, as is shown by the arrow referenced 55. The counterforce generated by the flexibility of the tongue 44 makes it possible to maintain contact between the portion 8 of the locking means and the edge 53 of the notch 52. Longitudinal play is thus suppressed.

In a complementary manner to the invention described above and with reference to all of the figures, at least one of the locking means 7, or even both of the locking means 7, may comprise a securing device. The function of said securing device is to limit the travel, in other words the movement, of the locking means 7 in at least one of its directions of movement while the end fitting 1 is being mounted on the end part of the longitudinal support 3. The risk of accidental actuation is thus limited and removal from the wiper is prevented.

On the end fitting 1, the securing device is in the form of an element which is formed on the locking means and extends at least longitudinally at a free end of the locking means and/or of the elastic arm.

According to one exemplary embodiment of the securing device, the latter is for example in the form of an element which extends beyond the portion 8. In other words, the element overlaps or juts out from the portion in the longitudinal direction L of extension of the end fitting 1, and in the direction of the closed part 41 of the end fitting 1. The element forms for example an edge that is designed to come into contact with at least one longitudinal face of the longitudinal support, that is to say one of the long faces which illustrate the flat, strip-like nature of the longitudinal support 3.

It will be noted that this edge is delimited by a surface approximately perpendicular to a face of the portion formed at the end of the locking means 7. The face is the one which comes into contact with the edge 53 of the notch 52 formed in the longitudinal support, while the surface is the one which bears against the longitudinal face of the longitudinal support, thereby preventing the elastic arm 14 from moving.

At the end of the elastic arm 14, the portion 8 and the securing device, notably the element, are formed. The elastic arm 14 comprises a zone in which at least one chamfer 15 (FIG. 3) is formed. This chamfer 15 allows the creation of a movement of the elastic arm 14 allowing the locking means 7 to retract during the mounting of the end fitting 1 on the end part of the longitudinal support 3. It will be noted that the securing device extends transversely in a manner straddling a part delimited by the chamfer 15 and a part delimited by the elastic arm 14.

As mentioned above, one face of the portion is in contact with an edge 53 of the notch 52, thereby making it possible to employ the locking means 7. The securing device of this locking means is active as soon as the surface is in contact with the longitudinal face of the longitudinal support.

Such a securing device finds advantageous application with the means 43 that forms a stop against the end part 6 of the longitudinal support 3. Specifically, the flexibility of the tongue 44 allows the end fitting 1 to move even after the locking means 7 is housed in the notch 52. This additional movement allows the securing device to cross the notch so as to bear against the face of the longitudinal support 3.

One variant embodiment of the securing device may be used on its own, that is to say replacing the element, or in combination therewith, so as to increase the level of security of the locking means. The securing device is in this case in the form of a tab extending from the body 30 of the end fitting 1. This tab is moulded simultaneously with the rest of the end fitting 1 and presents the possibility of being bent after the end part 6 of the longitudinal support 3 has been introduced. The tab thus comprises a bend at the limit of two portions which each extend in generally concurrent, and for example perpendicular, planes. The locking means 7 is secured as soon as the securing device covers the elastic arm of the locking means 7 and thus renders it inaccessible.

Another embodiment of the securing device is illustrated in FIG. 4. As for the embodiment described above, this embodiment of the securing device can be used on its own, that is to say replacing the element and/or the tab, or in combination with one and/or the other of these parts.

The securing device is in this case in the form of at least one low wall 39 made in one piece with the body 30 of the end fitting 1. It will be seen that the low wall 39 is formed laterally with respect to the locking means 7, that is to say on the side of the latter. The low wall 39 extends perpendicularly with respect to the plane of extension of the housing 5. It will be seen that the low wall 39 follows the profile of the elastic arm 14 over at least three sides of the latter, that is to say along its peripheral edge. The low wall 39 is thus in the immediate proximity of the locking means 7 and thus prevents anybody who wishes to actuate the elastic arm 14 from passing through a tool.

The end fitting 1 also comprises a set of reinforcements 40 that are made in one piece with the body 30 inside the volume delimited by the outside wall 27.

The methods for mounting a wiper equipped with an end fitting, for example the one explained above, will now be described.

According to a first method, the wiper 2 comprises at least one longitudinal support 3 and at least one component 24 attached to the longitudinal support 3. According to one embodiment, the component 24 may be one or more air deflectors 26 or a connection means 25 intended to mechanically connect the wiper 2 to an arm for driving in rotation. The wiper 2 employed in this method also comprises an end fitting 1 having a housing 5 which receives an end part 6 of the longitudinal support 3. The end fitting 1 also comprises at least one means 7 for locking the end part 6 of the longitudinal support 3 in the position fitted in the housing 5 after said end part 6 has been fitted into the housing 5. This locking takes place by engagement between the locking means 7 and a notch 52 formed in or on the longitudinal support 3. The end fitting 1 comprises a means 43 that forms a stop against the end part of the longitudinal support. According to the method, the end fitting 1 is pushed against the longitudinal support 3 so as to bend the means 43 that forms a stop and thus to allow the engagement of the locking means 7 with the notch 52.

In a complementary manner, the step in which the end fitting 1 is pushed against the longitudinal support 3 can also make it possible to render a securing device of the locking means 7 active, the function of said securing device being to limit the possibility of accidental manipulation of the locking means 7. The securing device is thus allowed to pass through the notch in order to bear against the face of the longitudinal support 3.

According to a second mounting method, which can replace the first mounting method or be combined therewith as an additional step of the first method, a step is carried out on the above-described wiper, during which step the end fitting 1 is threaded onto the end part 6 of the longitudinal support 3 until the locking means 7 engages with a notch 52 formed in the longitudinal support 3. This second method provides for the securing device, notably the tab, extending from the body 30 of the end fitting 1 to be deformed until the securing device, notably the tab, covers the locking means 7. Access to the locking means is thus prevented, thereby making the wiper non-removable.

The invention claimed is:

1. An end fitting for a vehicle window wiper, the wiper comprising at least one longitudinal support and a blade intended to be pressed against a window, the end fitting comprising:

a housing that is able to receive an end part of the longitudinal support;

at least one means for locking the end part of the longitudinal support in a position fitted in the housing; and at least one means that forms a stop against the end part of the longitudinal support, wherein the means is flexible so as to cause the locking means to bear against the longitudinal support.

2. An end fitting according to claim 1, wherein the flexibility of the means that forms a stop results from elasticity of the material of which the means is made.

3. An end fitting according to claim 1, wherein the means that forms a stop is a tongue that extends from an outside wall delimiting the end fitting.

4. An end fitting according to claim 3, wherein the tongue extends through an internal volume delimited by the outside wall in a direction concurrent with a plane in which most of the housing extends.

5. An end fitting according to claim 3, wherein the tongue has a parallelepipedal section.

6. An end fitting according to claim 3, wherein the tongue extends in a plane which forms an angle of between 10° and 85° with a longitudinal mid-plane of the end fitting.

7. An end fitting according to claim 1, wherein the means that forms a stop comprises two tongues that are formed on either side of a longitudinal mid-plane of the end fitting.

8. An end fitting according to claim 1, wherein the locking means comprises an elastic arm that is rotatable about an axis which extends approximately parallel to a plane in which most of the housing extends and perpendicularly to a longitudinal direction of the end fitting.

9. A wiper comprising:

at least one longitudinal support; and a blade intended to be pressed against the window, the longitudinal support comprising a notch formed in an end part of the longitudinal support; and an end fitting according to claim 1.

10. The wiper according to claim 9, wherein the locking means comprises a longitudinal blocking portion that bears against at least one edge of the notch, said bearing being brought about by the flexibility of the means that forms a stop.

11. The wiper according to claim 9, wherein the end part of the longitudinal support comprises at least one bevel that bears against a face of the means that forms a stop.

12. A vehicle window wiping system comprising an arm and a wiper according to claim 9.

* * * * *